(12) United States Patent
Dan et al.

(10) Patent No.: US 6,401,111 B1
(45) Date of Patent: Jun. 4, 2002

(54) INTERACTION MONITOR AND INTERACTION HISTORY FOR SERVICE APPLICATIONS

(75) Inventors: Asit Dan, Pleasantville; Ambuj Goyal, Katonah; Francis Nicholas Parr, Croton-on-Hudson, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/151,833

(22) Filed: Sep. 11, 1998

(51) Int. Cl.[7] .................. G06F 15/16; G06F 15/173
(52) U.S. Cl. ............................. 709/204; 709/224
(58) Field of Search ..................... 709/224, 202, 709/203, 101, 229, 227, 228, 204, 205, 103; 707/103; 705/1, 8, 59

(56) References Cited

U.S. PATENT DOCUMENTS

| | | | | |
|---|---|---|---|---|
| 4,799,156 A | * | 1/1989 | Shavit et al. ............... | 705/26 |
| 5,222,018 A | * | 6/1993 | Sharpe et al. ............... | 705/30 |
| 5,535,383 A | * | 7/1996 | Gower ..................... | 707/103 R |
| 5,638,519 A | * | 6/1997 | Haluska .................... | 705/28 |
| 5,768,587 A | * | 6/1998 | Freund et al. .............. | 709/101 |
| 5,790,789 A | * | 8/1998 | Suarez ..................... | 709/202 |
| 5,835,764 A | * | 11/1998 | Platt et al. ................. | 709/101 |
| 5,867,651 A | * | 2/1999 | Dan et al. .................. | 709/203 |
| 5,890,161 A | * | 3/1999 | Helland et al. ............. | 707/103 |
| 5,915,209 A | * | 6/1999 | Lawrence .................. | 340/3.7 |
| 5,958,004 A | * | 9/1999 | Helland et al. ............. | 709/101 |
| 6,038,538 A | * | 3/2000 | Agrawal et al. ............. | 705/7 |
| 6,092,053 A | * | 7/2000 | Boesch et al. .............. | 705/26 |
| 6,115,040 A | * | 9/2000 | Bladow et al. ............. | 345/335 |
| 6,115,690 A | * | 9/2000 | Wong ...................... | 705/7 |
| 6,138,104 A | * | 10/2000 | Marchak et al. ............ | 705/9 |
| 6,148,290 A | * | 11/2000 | Dan et al. .................. | 705/1 |

\* cited by examiner

*Primary Examiner*—Zarni Maung
*Assistant Examiner*—Jason D. Cardone
(74) *Attorney, Agent, or Firm*—F. Chau & Associates, LLP (57) ABSTRACT

A conversation monitoring system includes a communication network, two or more parties coupled to the communication network, each party having a computer application, and a conversation monitor located at at least one of the parties and adapted to provide an interaction history of long running conversations accessible to each computer application.

31 Claims, 10 Drawing Sheets

INTERACTION MONITOR AND INTERACTION HISTORY FOR SERVICE APPLICATIONS

FIELD OF THE INVENTION

The present invention relates to interaction monitoring systems used in electronic commerce. More particularly, this invention relates to automatically creating and maintaining, with an interaction monitor, interaction history data for a long running application wherein the interaction history data can be accessed by the application.

BACKGROUND OF THE INVENTION

With the substantial increase in use of the Internet and, particularly, the World Wide Web ("Web"), electronic commerce is emerging as an important tool for service providers. Such applications may be long running, perhaps spanning over many hours and days, where not only a single interaction may be asynchronous, i.e., a long time may pass before a response to a request is returned, but related interactions may be dispersed in time. Consequently, a need has developed for a system of providing long running service applications whose interaction history is maintained for application access so that compensation of an earlier service request is a capability.

Monitors are software systems that support simple creation and execution of application programs with complex requirements. They manage underlying resources (both physical computing resources as well as logical resources, such as data files) which the applications require and monitor the access to these resources in an orderly fashion. There are many types of monitors (e.g., transaction processing and security monitors) creating different application execution environments and ensuring different properties for these applications.

Figure 1:
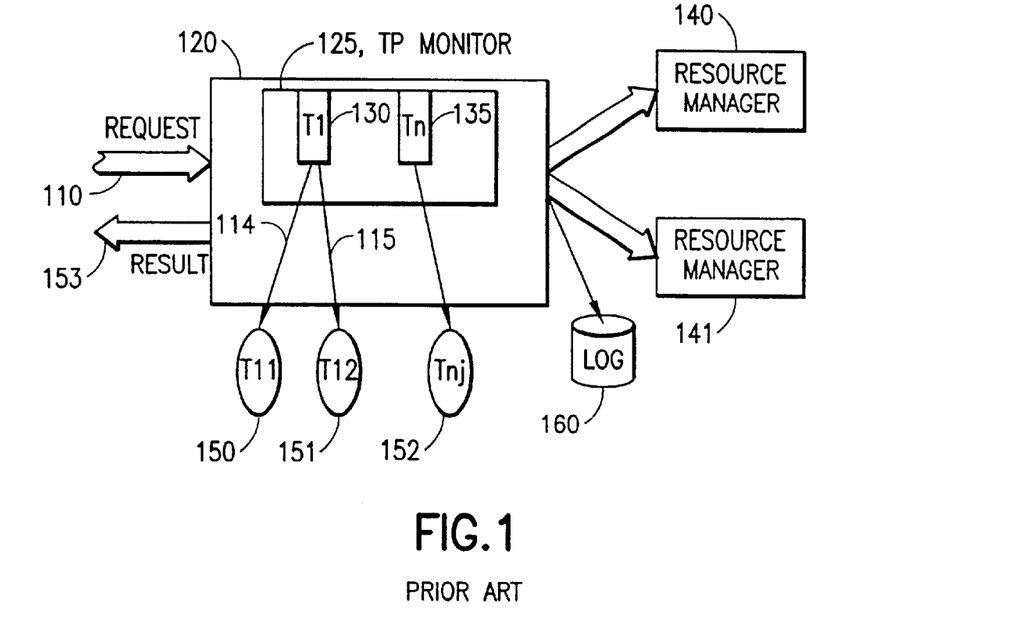
FIG. 1 is a schematic diagram of a conventional transaction processing monitor system.

FIG. 1 illustrates a conventional transaction processing (TP) monitor system for supporting transactional applications. Transactional applications access various data and logical resources such that access to these resources needs to be controlled to enforce certain properties, namely atomicity, consistency, isolation and durability (ACED). A TP monitor provides an execution environment for automatically ensuring these properties. The transactional applications T1 130 and Tn 135 are registered with the TP monitor 120. There can be many such transactional applications. Upon receiving a request 110 for execution of one such registered application (e.g., Tn 135), the TP monitor 120 allocates necessary physical resources to the system and instantiates an instance, Tnj 152, of the application Tn 135. The TP monitor 120 passes the input parameters received with the request to the application instance 152 over path 116. Each application instance is referred to as a transaction. Thus, transactions T11 150 and T1 12 151 are instances of the registered application T1 130. Once a transaction is completed, the results 153 are returned by the monitor 120 to the client application. In a different type of monitor environment, the application instance may be started and stopped locally under administration control.

Transactions access logical resources (e.g., databases) maintained by the resource managers 140 and 141. The monitor 120 intercepts all access to these resources by the transactions and maintains a history of access to these resources in their log 160. The monitor 120 also detects any application failure either due to a failure of the underlying computer system or due to software errors. As indicated hereinabove, the TP monitor system supports execution of transactions ensuring ACID properties. Atomicity refers to the property where all updates by a transaction to the monitored resources are made permanent only if the entire application succeeds. Incomplete execution of the application, due to any failure, will result in the restoration of the state of the resources to that state which existed prior to any access by the transaction. The TP monitor and/or resource managers maintain a history of accesses by all transactions to achieve this restoration of state. However, this history creation/maintenance is performed automatically by the monitor 120 without any knowledge of or assistance from the applications. Ensuring the other three properties (i.e., Consistency, Isolation and Durability) also requires monitoring any accesses to the controlled resources and making use of the history. Thus, the TP monitor provides reliability and execution support to applications by providing a system guarantee that all persistent effects are removed on failure.

Many other types of access monitors exist for ensuring a subset of these or other access properties (e.g., security, access control). In all cases, the underlying monitor intercepts access to the monitored resources by the supported applications and exercises certain access monitoring logic based on the present access state. However, in all cases, the applications are unaware of the details of the underlying operations of the monitor, other than the semantics of these properties guaranteed by the monitor. Therefore, in the TP monitor and the other similar access monitors of the prior art, the applications do not have direct access to the interaction history maintained by the monitor.

Figure 2:
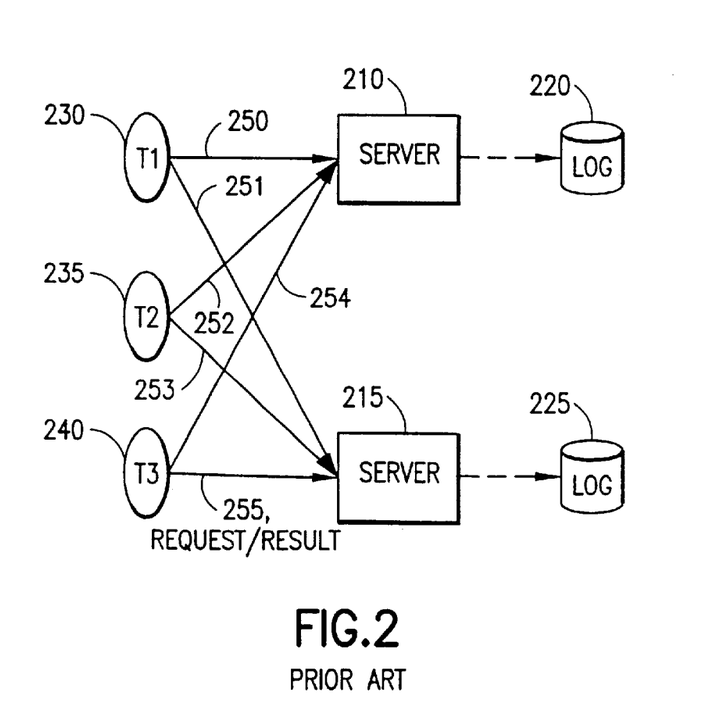
FIG. 2 is a schematic diagram of a conventional transactional application monitoring environment in which applications are executed in systems different from the monitor systems.

This conventional monitoring is implemented in many different ways. The monitoring logic may be distributed across many computer systems. Additionally, the applications may execute in a system different from the monitor systems. FIG. 2 illustrates the working of a transactional application executing outside the monitor systems. T1 230, T2 235 and T3 240 represent three instances (transactions) of transactional applications. These transactions access the logical resources monitored by the servers 210 and 215. All accesses to these resources by these transactions 230, 235 and 240 are referred to as transactional remote procedure calls (TRPCs) 250 through 255, since the access to the monitored resources follows the ACID properties. The monitoring software in the servers 210 and 215 coordinates the monitoring logic to achieve these properties. As in FIG. 1, the servers 210 and 215 maintain transaction logs 220 and 225, respectively to maintain various properties.

Figure 3A:
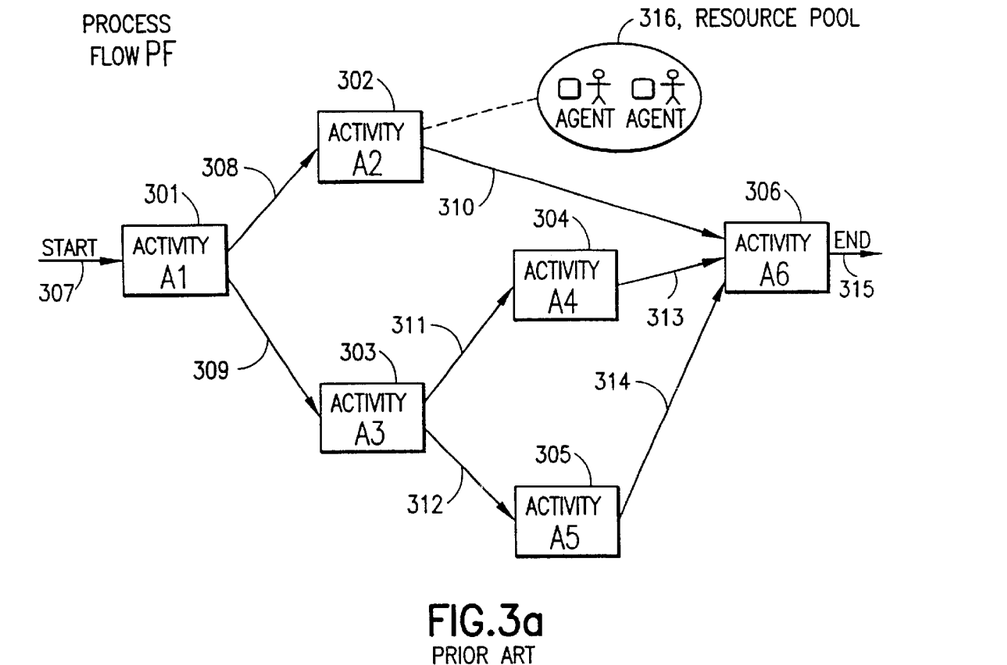
FIG. 3 is a schematic diagram of conventional workflow system.
Figure 3B:
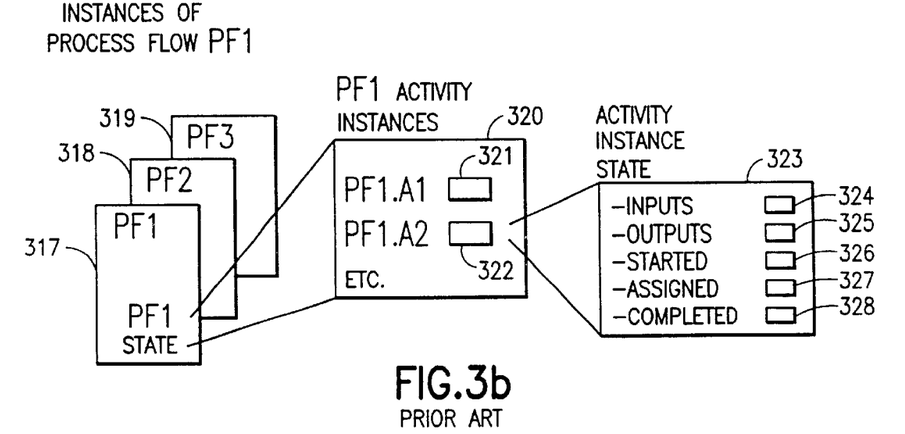

In contrast to typical ACID transactional applications, workflow applications are long running and may be created as multi-step applications consisting of independent application steps. Such applications are reliably executed under a workflow monitor. Workflow systems, e.g., IBM's Flowmark product, maintain a persistent record of process and process instance state for the purpose of controlling (starting and stopping) the activities in the process flows. The state management functions of a conventional workflow system are illustrated in FIG. 3. Workflow systems must store both the process flow form (for managed processes) and the state of each process instance. In FIG. 3(a), elements 301 through 316 show information which would be stored defining a process flow. In FIG. 3(b), elements 317 through 328 describe state information which would be recorded for each process instance.

In FIG. 3(a), the process flow PF includes activities or processing action blocks 301 through 306 which the workflow system is responsible for controlling. The arrows 307 through 315 represent data and control flows so that arrows 307 and 315 represent the start and the end of the process flow, respectively. The other data/control flow arrows, 308 through 314, show how the output data produced by the completion of one activity will be made available as input to other activities. The workflow system is responsible for scheduling activities as soon as all necessary inputs are available for them and managing the distribution of data to activities following the data/control flow arrows in the process flow graph. Element 316 is a pool of resources such as skilled agents. The work flow system, when starting an activity, may also be required to select an available and appropriately skilled resource to perform the activity. To carry out the above functions, workflow systems store a persistent record of the information illustrated above for process flow PF.

In addition, in order to be able to control instances of the defined process flow, workflow systems also maintain state information on each process flow instance. This information is usually persistent (e.g., stored on disk) so that business process flows can be recovered after a system failure, and because the process flows may be long lived. In FIG. 3(b), elements 317, 318 and 319 schematically represent state information for separate instances PF1, PF2 and PF3, respectively, of the process flow PF. Element 320 is an expanded view providing more detail of state information on process flow instance PF1 317. PF1's state is described by providing an activity instance state for each activity defined in the flow. The process flow PF consists of 6 activities. Elements 321 and 322 show that PF1's state includes a state for an activity A1 instance, PF1.A1, and an activity A2 instance PF1.A2. This pattern is repeated for the other activities in the flow. Element 323 is an expanded view of the state information for each activity instance. Typically, this might consist of: the input values 324 for the activity, the outputs 325 produced if it is already complete, whether or not the activity has been started 326, any specific resource 327 assigned to process the activity, and whether or not the activity has completed 328. The above highly structured collection of state information enables a workflow system to schedule and control activities following the defined process flows.

The hereinabove-described ACID properties of conventional TP systems have less relevance in the new workflow-dominated Internet environment where end users are initiating potentially global business interactions, each one of which may span multiple independent enterprises. A participating organization cares much more about what it has committed to deliver and is legally obligated to do, rather than whether its database is consistent with the databases in partner organizations. Practical multiparty business interactions on the Web are more concerned with (1) have the business actions been durably recorded?, (2) what application defined compensation actions are available if cancellation is desired?, and (3) what automatic expiration periods are required by the business and legal agreements between the parties?

Event monitoring is a conventional practice used in many computer applications where a record of at least some of the events occurring in the computer program is generated to help with subsequent analysis of a particular execution, data mining of executions to extract additional useful information, auditing or other purposes. These event logs are usually persistent since they are used outside the program by other analysis processes and do record some information about which "states" occurred during execution of the application.

Figure 4:
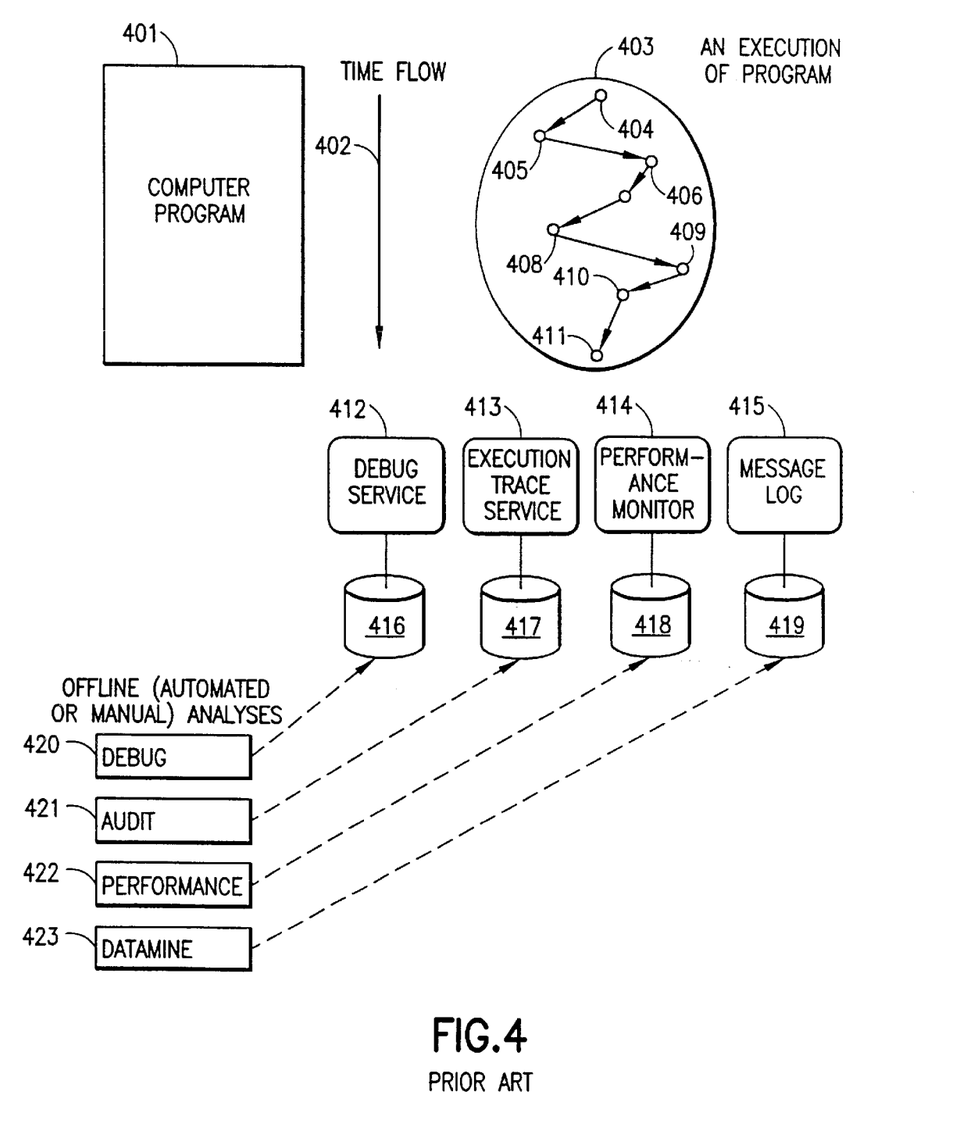
FIG. 4 is a schematic diagram of a general conventional event monitoring system.

FIG. 4 illustrates a conventional event logging system. Element 401 represents a computer application program. A particular execution 403 of program 401 is also shown. This execution 403 consists of a sequence of events 404 through 411. The timeflow arrow 402 shows that these events occur as a sequence in time. These events may be monitored and recorded on some persistent log to allow offline analysis. This monitoring is illustrated with four example services: a debug service 412, an execution trace service 413, a performance monitor 414 and a message or console log 415. Each of these services captures and makes a record of the events in the execution of the program 401 relevant for its purposes. The events usually are saved persistently on logs 416 through 419. The event logs are then made available for either automated or manual offline analysis. This analysis can include debugging 420 during development of the computer application 401, an audit 421 of executions of the application 401, analysis of the program's execution performance 422 and data mining 423 to extract useful business information from the sequence of events occurring during the program's execution.

In these conventional event logging services, the use of the event logs is not coupled directly with execution of the application or program which generated the event sequence. Therefore, the application does not have access to the event logs.

Thus, there is a need for a monitoring system which provides application access to the interaction data of a long running application.

There is also a need for a monitoring system that provides and manages simple application defined compensation of actions.

Finally, there is a need for a monitoring system which provides end users with a reliable view of canceling, reissuing and modifying particular service requests.

SUMMARY OF THE INVENTION

The present invention provides a new form of monitor and interaction history to meet the new requirements of business service applications in an e-commerce, networked computer environment. The conversation monitor of the present invention manages the execution of a set of business service application instances executing on a business service engine. It monitors all interaction between these business service applications and between other services and parties executing elsewhere. The monitor automatically creates a persistent record of these interactions as the interaction history, without the need for explicit instructions to do so in any of the business service interactions. Finally, the monitor starts new business service interaction instances in response to requests from clients for new conversations and stops the instances at the request of either the client or the monitor.

The interaction history of the present invention is a persistent record of all interactions. It is accessible to the business service applications, as well as to the conversation monitor. The interaction history is structured to: provide convenient information to the business service application concerning its long term state, enable the conversation monitor to automatically support cancellation and compensation of complete conversations, specific actions and groups of actions; provide clients with a stable record of their interactions with the business service; and provide a base for enforcing service contract agreements in which this service is a partner.

BRIEF DESCRIPTION OF THE DRAWING

The present invention will be understood by reference to the drawing, wherein.

DETAILED DESCRIPTION OF THE PREFERRED EMBODIMENT

Figure 5:
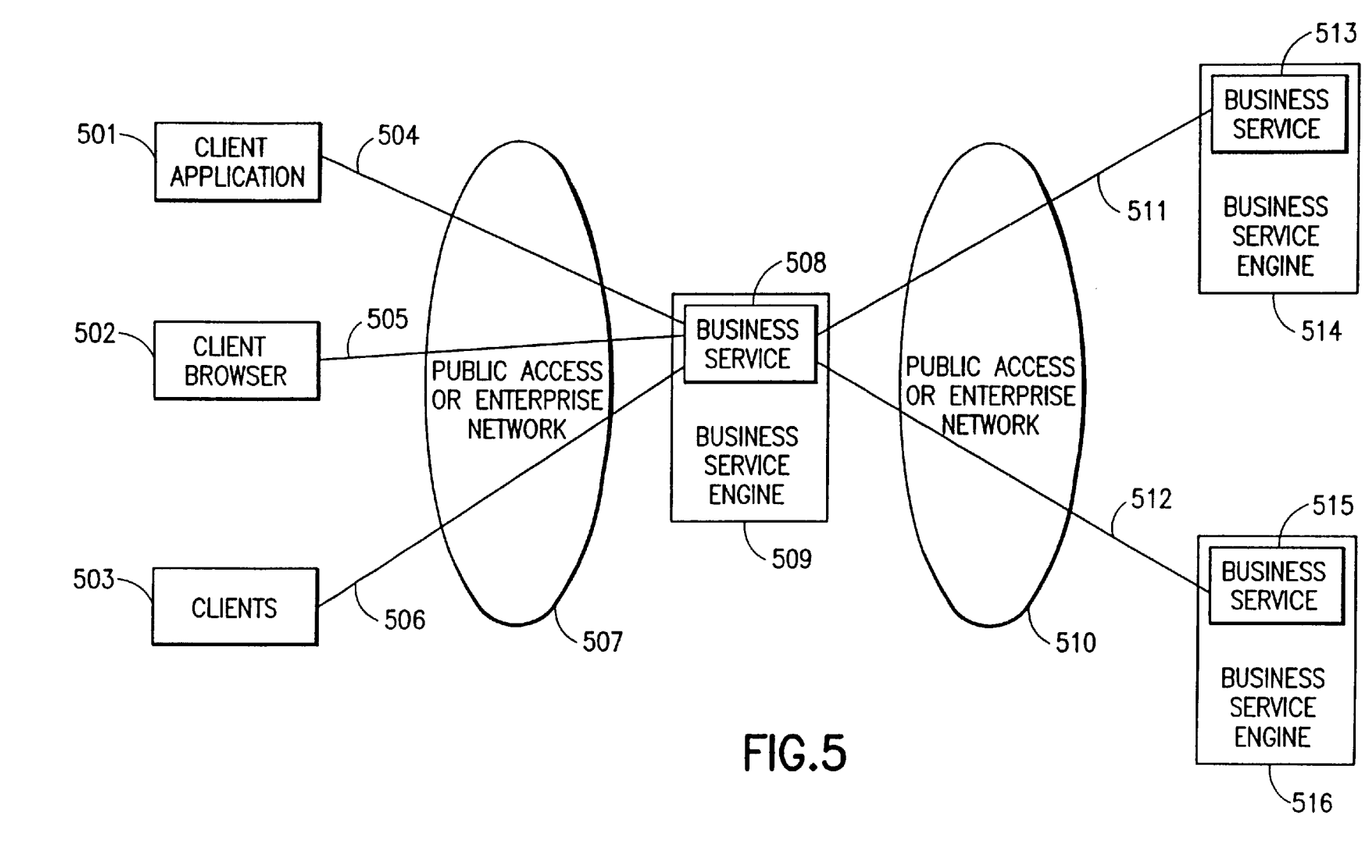
FIG. 5 is a schematic diagram of a system environment incorporating a business service application that interacts with many other applications.

Although it can be applied to other environments, the conversation monitor of the present invention has most immediate value in the context of providing a business service on a public network as illustrated in the context of FIG. 5. The invention is motivated by the need to be able to provide automated business services, accessible to many clients via widely accessible public or enterprise networks. The service may be implemented by using other business services typically provided on other service processors, belonging to different organizations and also reached via widely accessible public or enterprise networks.

FIG. 5 illustrates the concept of an automated business service on a public or widely accessible network. A business service 508 is provided in a networked environment and is implemented as a computer program. This business service program 508 executes on the business service engine 509. Clients 501, 502 and 503 make requests to this business service 508. They typically execute on workstations and PCs which reach the engine 509. The clients may be application programs 501 or browsers 502 providing an end-user with direct access to the system. Links 504, 505 and 506 are conversational connections established by the clients across the public access or enterprise communication network 507 to request the business service 508.

The business service 508 may request subordinate business services 513 and 515 executing on distinct business service engines 514 and 516, respectively. The business service 508 reaches these subordinate business services via conversational connections 511 and 512 which are made through a public access or enterprise communication network 510.

The conversation monitor of the present invention monitors and, preferably, records persistently all interactions between a particular business service application and other remote parties and services. These interactions are naturally grouped into conversations. Each conversation is a series of interactions with a fixed specific end point. Conversations, like business services, can last for an extended period of time (e.g., hours, weeks etc.) and involve multiple interactions in both directions on each conversation. In a networked business service, there is one distinguished conversation which is responsible for initiating the business service instance. Other conversations are outbound from the business service engine and are initiated to subcontract out parts of the business service implementation. Conversations may also include multiple (3 or more) parties exchanging messages in a bidirectional manner.

The conversation monitor of the present invention provides automated support in handling the initiating conversation and starting the business service in response to it. It then intercepts all requests by the business service application to establish additional conversations. Furthermore, it intercepts all interactions which flow on any of these conversations and records them, preferably persistently, in a log which is structured to be accessible and convenient for use by the business service applications. Thus, the interaction history for executions of the business service application is created entirely by automated processing in the conversation monitor.

The conversation monitor of the present invention can monitor and provide automated interaction history generation for many business service application instances concurrently.

Figure 6:
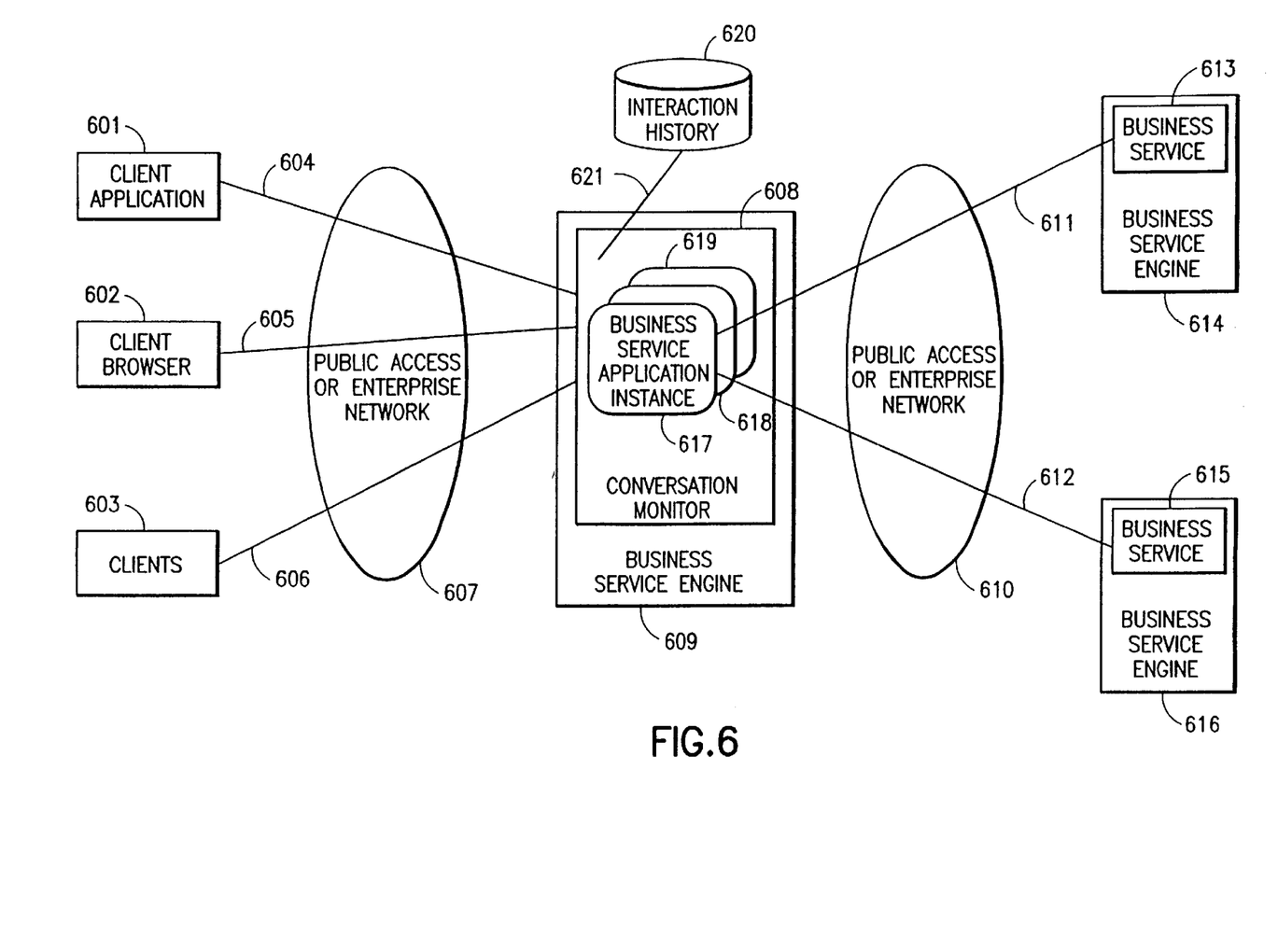
FIG. 6 is a schematic diagram of an embodiment of a conversational monitoring system of the present invention.

The above properties of the conversation monitor are illustrated in FIG. 6 which expands upon the elements in FIG. 5, illustrating the networked business service context of the preferred embodiment. Elements 601 through 607 and 609 through 616 correspond to the elements 501 through 507 and 509 through 516 in FIG. 5. In FIG. 6, the business service shown as element 508 in FIG. 5 is now expanded. This service is now seen to consist of a conversation monitor 608 according to the present invention which hosts a number of business service execution instances 617, 618, 619, all executing concurrently. The conversation monitor 608 manages and monitors the inbound conversations 604, 605 and 606 and the outbound conversations 611 and 612. Each of these conversations connects some remote party the examples in the diagram being 601, 602, 603, 613, and 615, with one of the business service execution instances. The conversation monitor records all interactions on these conversation in the persistent interaction history 620. The interface 621 illustrates the role of the conversation monitor in managing access to the interaction history. The conversation monitor will automatically record all conversational interactions in this history without any explicit request to do so in the business service application programs 617 through 619. But these programs can freely and conveniently read a record of their interactions from the interaction history 620 via an interface 621 provided by the conversation monitor 608.

Figure 7:
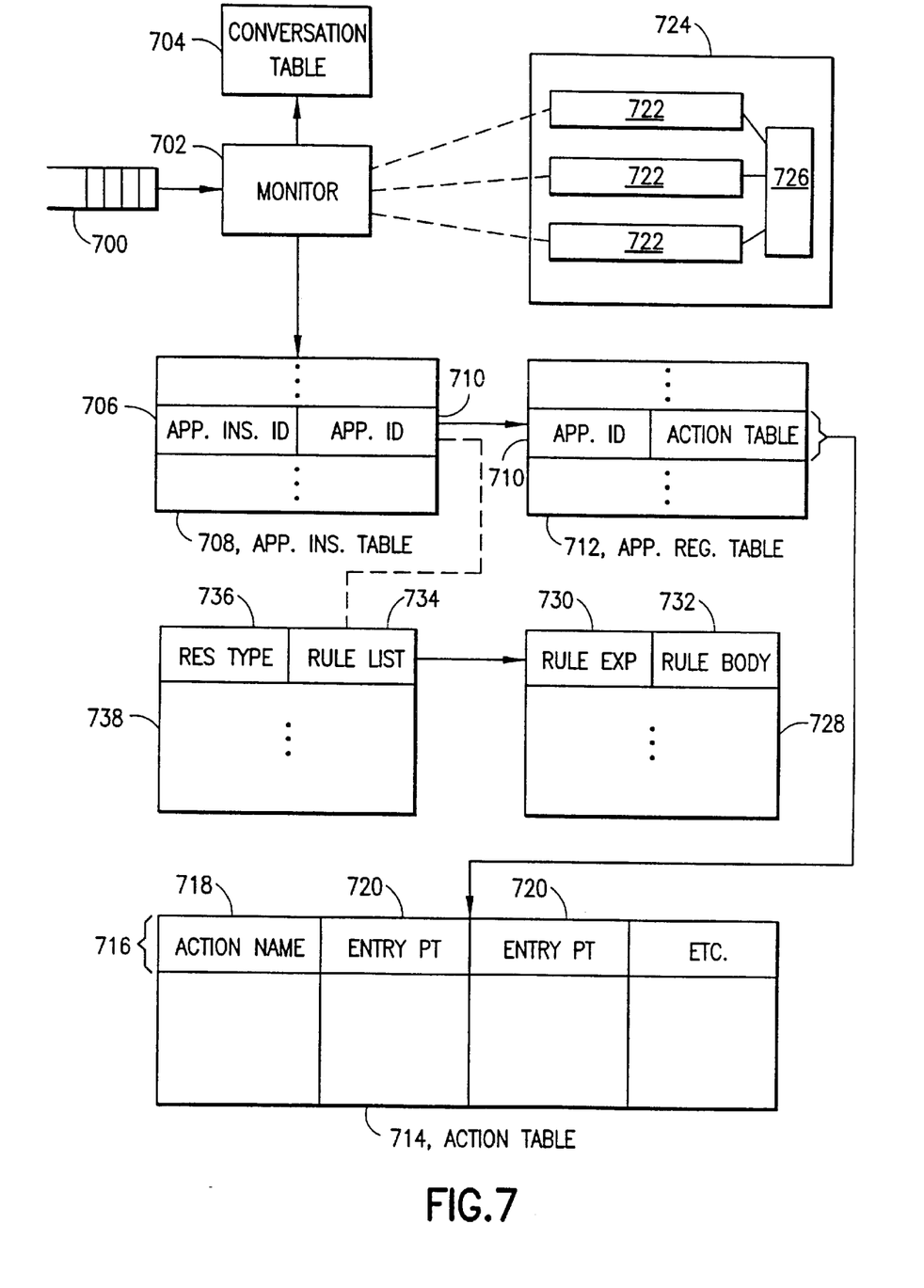
FIG. 7 is a schematic diagram of a method of handling requests and responses by the conversation monitor of the present invention.

In the course of a conversation, the clients can receive requests from the business service engine. That is, the requests in the system are bidirectional. FIG. 7 illustrates the handling of requests and responses (messages) by the conversation monitor of the present invention. All messages for a particular conversation are placed in a queue 700. The monitor 702 processes in turn, each message and takes appropriate actions. The monitor 702 timestamps the message and updates the a conversation table 704 to record this message and updates the states of the conversation. From the conversation table 704, the monitor 702 matches an application instance ID 706 in an application instance table 708 with the conversation ID (see further hereinbelow). The application instance ID corresponds to an application ID 710 located in an application registration table 712. A set of actions associated with each application are registered with the monitor 702 during application registration. These actions for each application are listed in the action table 714. Each action record 716 includes action name 718 and one or more application entry points 720. The entry points 720 are associated with code segments 722 of a long running application 724 that can be invoked by the monitor 702. Examples of entry points are new action, cancellation of an action, modification of an action, commit, etc. Each code segment 722 represent a transaction or a method of an object. The code segments share common instance data 726.

During executions of the application, the application instance may register additional rules 728 with the monitor 702. These rules 728 include a rule expression 730 to be evaluated by the monitor 702 and a rule body 732 to be invoked by the monitor if the expression is true. A set of these rules 734 are associated with a particular response or response type 736 as specified by the application instance during the dynamic registration of the rules. This information is maintained in a response action table 738.

The processing of a message is as follows. On an incoming request (new, cancel, modify, etc), the monitor 702 first identifies the application instance ID 706 and, hence, the application ID 708. It then uses the application registration table 712 to identify the entry point(s) to be invoked. On an incoming response, the monitor 702 uses the response action table 738 to identify the set of rules to be evaluated. If one or more rules are true, the monitor 702 invokes the corresponding rule body. The rule body specifies one or more application entry points to be invoked.

Figure 8:
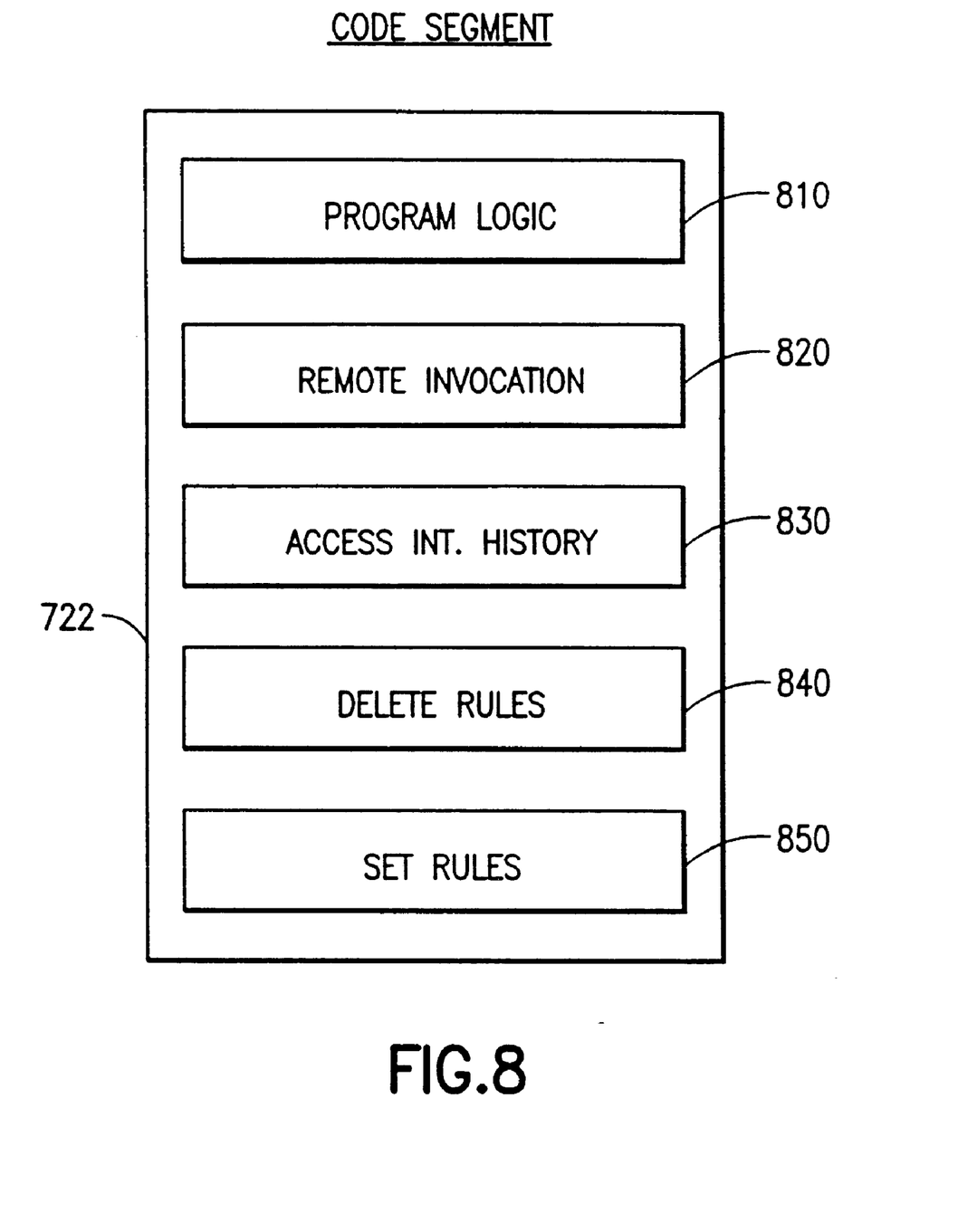
FIG. 8 is schematic diagram of a code segment according to an embodiment of the present invention.

FIG. 8 illustrates the structure of a code segment 722 according to an embodiment of the present invention. The code segment 722 includes one or more functional blocks of the following types. Program logic 810 includes general application-specific logic. Remote invocation 820 represents invocation of a remote service as a new action or operations on an existing action (e.g., cancel, modify, etc.). Accessing interaction history 830 represents query of the interaction history via the monitor of the present invention. Delete/modify rules 840 represents the deletion or modification of rules previously registered by this application instance. Finally, set rules 850 represents registration of new rules with the monitor on behalf of this application instance.

Figure 9:
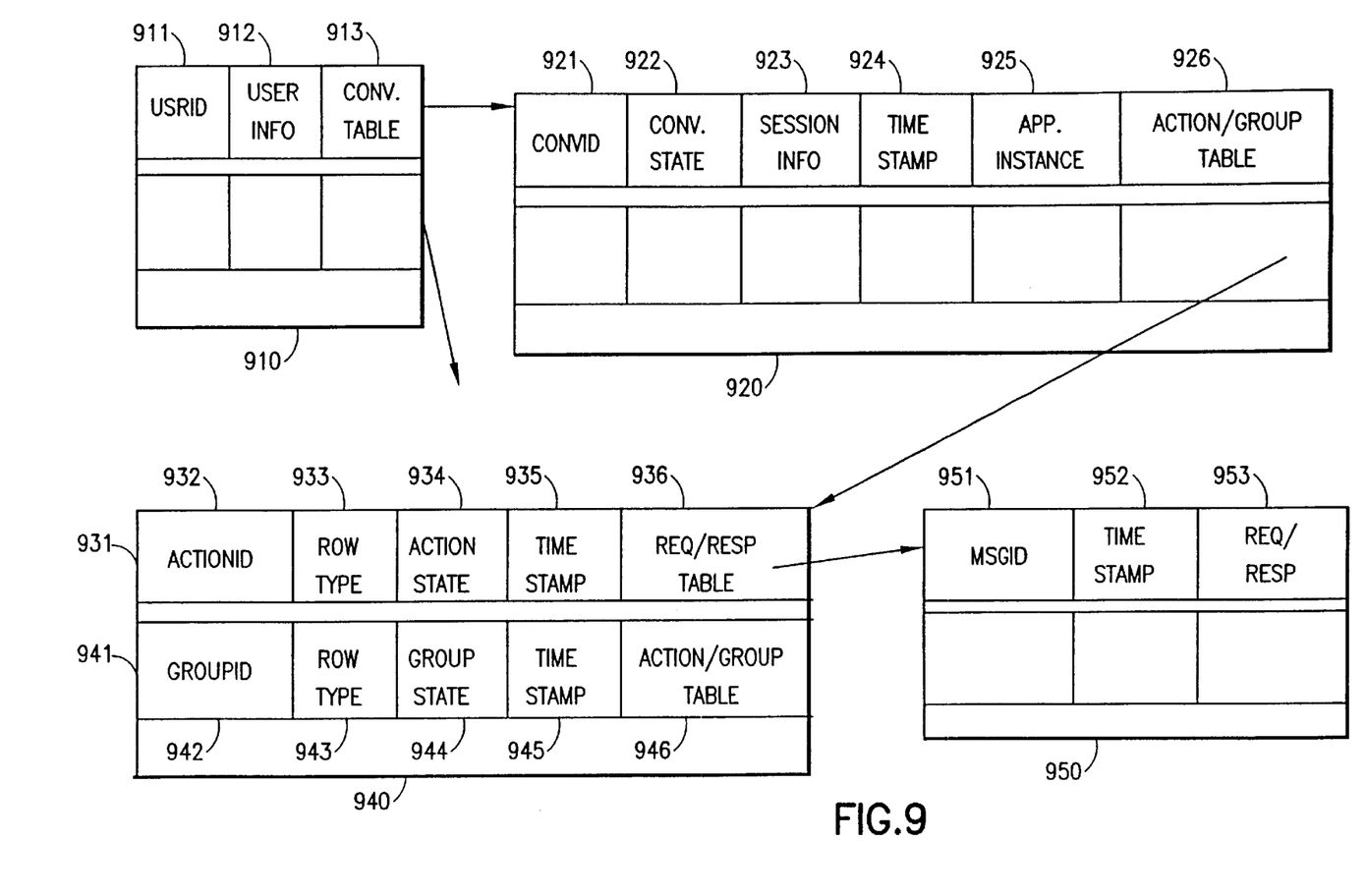
FIG. 9 is a schematic diagram of the conversation history tables of the interaction history according to an embodiment of the present invention.

FIG. 9 illustrates the structure of the interaction history (conversation) tables of the present invention. Each row of a user info table 910 includes a userid 911, additional user information 912 and an associated conversation table ID 913. Each conversation table 920 associated with a conversation table ID 913 consists of a conversation ID 921, a conversation state 922, session information 923, a time stamp 924, an application instance ID 925 and an associated action/group table ID 926. Rows of each action/group table 940 can be of two types: action 931 and action group 941. An action row 931 includes an action ID 932, a row type 933, an action state 934, a time stamp 935 and a request/response table ID 936. An action group row 941 includes an action group ID 942, a row type 943, an action group state 944, a time stamp 945 and an action/group table ID 946. Each row of a request/response table 950 includes a message ID 951, a time stamp 952 and the content of the message (request/response) 953. The action/group table ID 946 represents a table of type 940.

Figure 10:
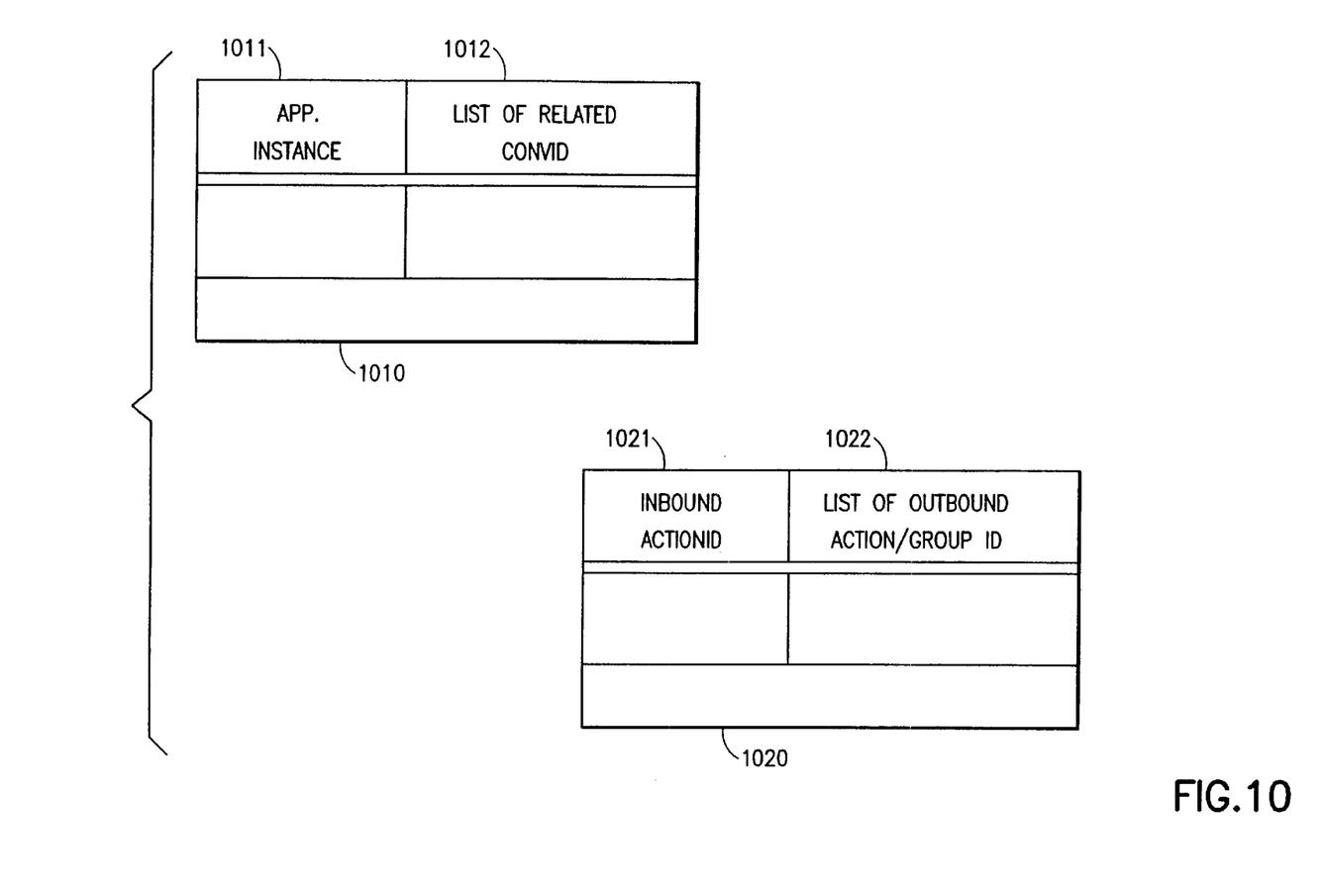
FIG. 10 is a schematic diagram of the conversation correlation tables of the interaction history according to an embodiment of the present invention.

Multiple conversations may be associated with a single application instance. A single inbound service request to the application instance may cause invocation of multiple outbound service requests as part of one or more conversations. FIG. 10 illustrates relationships across actions of different conversations maintained by an application instance. The application instance conversation correlation table 1010 maintains a list of conversations 1012 associated with a single application instance 1011. Action correlation table 1020 maintains a list of outbound action or action group IDs 1022 associated with an inbound action ID 1021. A cancellation request on a conversation results in cancellation of all other conversations associated with this application instance. A cancellation request of an inbound action results in cancellation of all related outbound actions. Finally, a cancellation of an action group results in cancellation of all action related to the group.

The interaction history is structured so as to be useful in several ways. First, the interaction history is structured so the business service application can use it to guide its processing, summarizing previous states. Second, having the interaction history automatically stored in a log relieves applications from having to store state information internally during inactive periods in the (long running) business service conversations. Third, clients of the business service may recover the state of their interaction with the business service by analyzing or browsing the persistent interaction history generated on the server by the conversation monitor. Fourth, the fact that the interaction history is generated by the conversation monitor on the server means that an end user can connect back into their interaction with the business service from different network-connected client platforms at different times. Fifth, the automatically generated interaction history creates a reliable record of interactions between the business service and other networked services which can be used in enforcement of agreements and contracts between networked servers. Finally, the interaction history is structured to facilitate automated cancellation or compensation of natural groupings of interactions: a complete business service instance, a complete conversation or a set of business service application actions grouped together as a compensation group with the requirement that all should succeed or all should be compensated.

The ability to automate the compensation or cancellation of key groupings of business service application actions by processing the interaction history is another key capability of the conversation monitor. When a single function or a set of functions (defining the ability to accept a particular class of conversation requests) is defined to the monitor by registering it, a cancellation or compensate action may also be defined. The conversation monitor will then process requests from its monitored business service application to compensate larger compound blocks of activity by running through interaction history and compensating each of the included subactions.

To facilitate this compensation processing, the conversation monitor may require that the actions which can occur in any conversation class are grouped into: the new actions which can initiate an instance of the conversation, modify actions which alter the state of the conversation, read actions requesting information on the conversation without altering its state and cancel or undo actions ending the conversation and compensating for any business actions taken within it.

A compensation group is a block of actions in a business service application, which the interaction monitor will ensure is either executed completely with every action succeeding, or is entirely undone with every included action either done and then properly canceled or compensated, or not executed in the first place. Examples of compensation include a refund of an earlier purchased item, cancellation of a reservation, exchanging items and changing the attributes of a previous request. When there are conversation monitors at both ends of a conversation over an unreliable communication link, the interaction histories can be used to reliably detect duplicated or lost interaction messages.

A final property of the conversation monitor and interaction history is that the persistent interaction history enables the conversation monitor to carry out its recovery and compensation functions in a highly parallel networked environment where, in the course of providing response to a particular request in a business service applications, many "subcontracted" requests are made in parallel to other networked servers and service applications.

Figure 11:
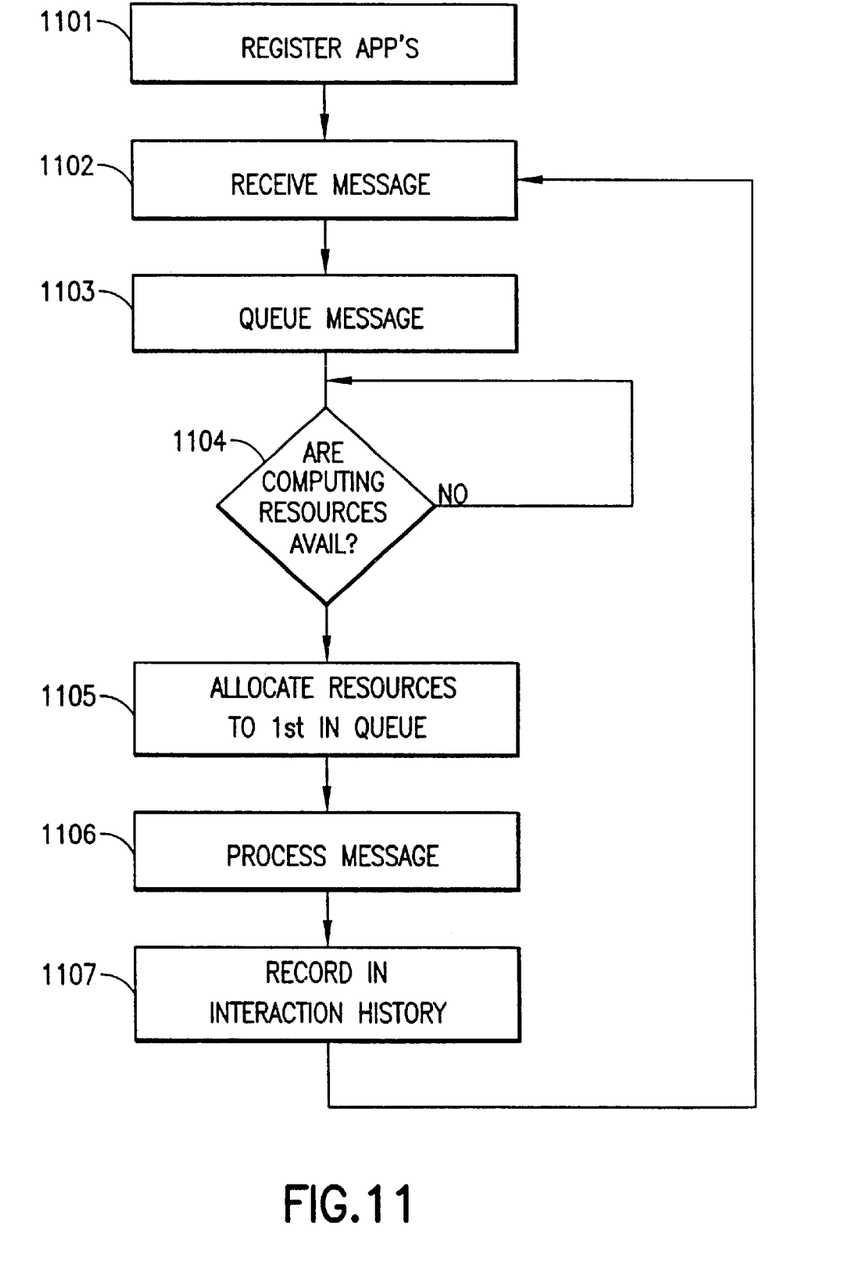
FIG. 11 is a block diagram of a process of the conversational monitoring system according to an embodiment of the present invention.

FIG. 11 is a block diagram showing an embodiment of the process of the conversational monitor of the present invention. In step 1101, applications are registered with the monitor. In step 1102, a message (request or response) is received from an end user, client application or client browser. The monitor maintains a record of the users it knows. The request preferably identifies a service name. The monitor enables reliable execution of a request even if it is reissued due to the long-running nature of the application. The monitor also checks the validity of the request as defined by the application during registration. In step 1103, the monitor schedules the processing of an instance of the application by placing the message in a logical queue. In step 1104, it is determined whether computing resources are available to satisfy the request. If not, the process loops to step 1104 again. If it is determined that the computing resources are available, they are allocated to the first queued request in step 1105. In step 1106, the monitor processes the message. A new request initiates the start of a new conversation. A request to modify or cancel an existing request leads to the invocation of a method as described hereinabove. A response results in the evaluation of rules as described hereinabove. Finally, a request from an application instance leads to remote invocation, query of the interaction history or rule modification. In step 1107, the monitor records all requests and responses with the client, remote resources or other monitors. The monitor builds and maintains persistent conversation states and a persistent interaction history recording all incoming action requests, their associated client and server service invocation numbers and their input and reply parameter lists. The interaction history, which is preferably kept in a database, is provided for applications to access.

Now that the invention has been described by way of a preferred embodiment, various modifications and improvements will occur to those of skill in the art. Thus, it should be understood that the preferred embodiment is provided as an example and not as a limitation. The scope of the invention is defined by the appended claims.

We claim:

1. A conversation monitoring system comprising:
   a communication network;
   a plurality of nodes coupled to the communication network, one or more of the nodes having a computer application program; and
   a conversation monitor located at at least one of the nodes and adapted to provide an unchangeable interaction history of long running conversations that is independently accessible by each computer application program irrespective of whether the unchangeable interaction history has been accessed by the computer application program at another one of the one or more of the nodes having the computer application program, wherein the unchangeable interaction history comprises messages unrelated to data committal and application creation that are exchanged between at least two of the plurality of nodes, the messages comprising requests and responses.

2. The system of claim 1 wherein the plurality of nodes comprises a client and a server and wherein the conversation monitor is located on the server.

3. The system of claim 2 wherein the interaction history comprises a record of all incoming requests to the server and all outgoing messages from the server to system resources or other parties.

4. The system of claim 3 wherein a relationship between a set of outgoing messages and incoming requests is maintained where the set of outgoing messages is transmitted in response to the incoming requests.

5. The system of claim 1 wherein the conversation monitor is adapted to automatically record each conversational interaction between two or more of the plurality of nodes.

6. The system of claim 5 wherein the conversation monitor is adapted to record each interaction without any explicit request to the conversation monitor to do so.

7. The system of claim 1 wherein the interaction history is adapted to permit at least one computer application program to read a record of interactions.

8. The system of claim 7 wherein the record of interactions is indexed by a context of a complete business service instance, a complete conversation or a set of business service application actions.

9. The system of claim 1 wherein the interaction history is structured to facilitate automated compensation of natural groupings of interactions.

10. The system of claim 9 wherein the natural groupings comprise a complete business service instance, a complete conversation or a set of business service application actions grouped together with the requirement that all should succeed or all should be compensated.

11. The system of claim 1, wherein the unchangeable interaction history corresponds to multiple conversations between three or more parties.

12. The system of claim 11, wherein relationships across actions of the multiple conversations are maintained.

13. The system of claim 10 wherein incoming messages are processed in a context of a complete business service instance, a complete conversation or a set of business service application actions.

14. The system of claim 1 wherein the interaction history is structured to facilitate automated compensation of all or part of the conversations.

15. The system of claim 1 wherein the interaction history is saved persistently to allow recovery of conversation states.

16. The system of claim 1 wherein the communication network is a Internet network.

17. The system of claim 1, wherein the interaction history also comprises messages related to data committal and application creation that are exchanged between the at least two of the plurality of nodes.

18. The system of claim 1, wherein multiple conversations are associated with a single application instance of at least one computer application program.

19. The system of claim 1, wherein at least one computer program includes more than one transaction.

20. The system of claim 1, wherein the conversation monitor comprises at least two conversation monitors, each of the at least two conversation monitors respectively located at at least two of the plurality of nodes and recording a corresponding interaction history used to detect duplicated or lost interaction messages over an unreliable communication link.

21. The system of claim 1, wherein the plurality of nodes comprise a plurality of servers and the communication network is a parallel networked environment such that a plurality of subcontracted requests are made in parallel to at least two of the plurality of servers in response to a particular request from another one of the plurality of servers.

22. The system of claim 1, wherein the interaction history comprises information relating to enforcement of agreements and contracts between at least two business parties respectively associated with at least of the plurality of nodes.

23. The system of claim 1, wherein the conversation monitor is capable of receiving queries directed to the conversation monitor regarding the unchangeable interaction history and returning query results in response thereto.

24. A method of monitoring a long running service application conversation between a plurality of nodes coupled to a communication network, the method comprising the steps of:

receiving a message from one of the nodes;

building, responsive to the receiving step, an unchangeable interaction history of the conversation; and independently providing, to any of the plurality of nodes, application access to the unchangeable interaction history irrespective of whether the unchangeable interaction history has been accessed by any other of the plurality of nodes, wherein the unchangeable interaction history comprises messages unrelated to data committal and application creation that are exchanged between at least two of the plurality of nodes, the messages comprising requests and responses.

25. The method of claim 24 wherein the message is a request or a response.

26. The method of claim 24 wherein the receiving step comprises the step of receiving, at a server party, a request or response from a client party.

27. The method of claim 24 wherein the plurality of nodes comprises a server and a client and wherein the receiving step comprises the step of receiving, at the server, a request or a response from the client.

28. The method of claim 24 further comprising the steps of:

scheduling processing of an instance of an application;

determining whether resources are available to satisfy the message;

allocating, responsive to the determining step, resources for the message;

processing the message;

recording the message in the interaction history; and providing the interaction history to one or more applications.

29. The method of claim 24 wherein the message is a request or a response.

30. The method of claim 24 wherein the message is a request and wherein the method further comprises the step of checking the validity of the request.

31. A conversation monitoring system comprising:

a communication network;

a plurality of nodes coupled to the communication network, the plurality of nodes including a client node and at least two server nodes, the client node and the at least two server nodes each respectively having a computer application program; and a conversation monitor located at at least one of the nodes and adapted to provide an unchangeable interaction history of long running conversations that is independently accessible by each of the computer application programs irrespective of whether the unchangeable interaction history has been accessed by any other of the computer application programs, wherein the unchangeable interaction history comprises interactions between the client node and at least one of the at least two server nodes and interactions between the at least two server nodes, the interactions comprising messages unrelated to data committal that are exchanged between the client and the at least one server and between the at least two server nodes.

\* \* \* \* \*